United States Patent
Ito et al.

(10) Patent No.: US 12,400,492 B2
(45) Date of Patent: Aug. 26, 2025

(54) INFORMATION PROCESSING APPARATUS AND STORAGE MEDIUM

(71) Applicant: HONDA MOTOR CO., LTD., Tokyo (JP)

(72) Inventors: Hiroshi Ito, Tokyo (JP); Shinya Yoshino, Tokyo (JP); Shota Shiratori, Tokyo (JP); Wataru Hashiguchi, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 163 days.

(21) Appl. No.: 17/973,692

(22) Filed: Oct. 26, 2022

(65) Prior Publication Data

US 2023/0169803 A1 Jun. 1, 2023

(30) Foreign Application Priority Data

Dec. 1, 2021 (JP) ................................ 2021-195623

(51) Int. Cl.
*G07C 5/08* (2006.01)
*B60W 50/00* (2006.01)
*B60W 50/14* (2020.01)
*G07C 5/00* (2006.01)

(52) U.S. Cl.
CPC ........... *G07C 5/0808* (2013.01); *B60W 50/14* (2013.01); *G07C 5/008* (2013.01); *G07C 5/0816* (2013.01); *B60W 2050/146* (2013.01)

(58) Field of Classification Search
CPC .... G07C 5/0808; G07C 5/008; G07C 5/0816; B60W 50/14; B60W 2050/146
USPC ......................................................... 701/31.4
See application file for complete search history.

(56) References Cited

U.S. PATENT DOCUMENTS

| 9,858,733 B2 | 1/2018 | Ohno et al. | |
| 2007/0100519 A1* | 5/2007 | Engel ..................... | G07C 5/008 |
| | | | 701/31.4 |
| 2016/0050356 A1* | 2/2016 | Nalepka ................. | H04N 7/181 |
| | | | 348/148 |

(Continued)

FOREIGN PATENT DOCUMENTS

| CN | 2026-96661 U | 1/2013 |
| JP | 2005-043138 A | 2/2005 |

(Continued)

OTHER PUBLICATIONS

Office Action dated Jun. 3, 2024, issued in counterpart Japanese Application No. 2021195623, with English translation. (8 pages).

(Continued)

*Primary Examiner* — Mahmoud S Ismail
(74) *Attorney, Agent, or Firm* — WHDA, LLP

(57) ABSTRACT

An information processing is provided. An acquisition unit acquires, from a server that accumulates vehicle information, the vehicle information including a trouble code stored by a control device of a vehicle, a status about an event to be identified by the trouble code, and date and time information associated with the trouble code and the status. A generation unit generates display data for displaying a sequence of a trouble in the vehicle, based on the vehicle information that has been acquired by the acquisition unit. A display control unit causes a display device to display the display data that has been generated by the generation unit.

13 Claims, 10 Drawing Sheets

(56) References Cited

U.S. PATENT DOCUMENTS

| | | | | |
|---|---|---|---|---|
| 2017/0092020 A1* | 3/2017 | Hathaway | ............ | G07C 5/0808 |
| 2017/0372536 A1* | 12/2017 | Ohno | ................... | G07C 5/0808 |
| 2021/0074081 A1* | 3/2021 | Saito | ...................... | G07C 5/085 |
| 2021/0375077 A1 | 12/2021 | Kawahara et al. | | |
| 2022/0036664 A1* | 2/2022 | Jankowski | ............ | B62D 53/06 |
| 2022/0157086 A1* | 5/2022 | Dudar | ................. | G07C 5/0808 |
| 2023/0030805 A1* | 2/2023 | Jung | ................... | H04L 63/0435 |
| 2023/0237860 A1* | 7/2023 | Mattern | ................ | G06Q 10/20 |
| | | | | 701/29.3 |

FOREIGN PATENT DOCUMENTS

| | | |
|---|---|---|
| JP | 2005-059671 A | 3/2005 |
| JP | 2015-047912 A | 3/2015 |
| JP | 2015-229364 A | 12/2015 |
| JP | 2020-055489 A | 4/2020 |
| JP | 2021-048493 A | 3/2021 |
| KR | 10-2015-0045023 A | 4/2015 |

OTHER PUBLICATIONS

Office Action dated May 28, 2025 issued in counterpart CN application No. 202211269492.5 with English translation. (16 pages).

\* cited by examiner

F I G. 2

| VEHICLE ID | EVENT ID | OCCURRENCE TIME | TROUBLE CODE NAME | STATUS |
|---|---|---|---|---|
| V001 | V001-001 | 20YY-MM-DD-hh:mm:ss | A001 | Pend |
| V001 | V001-002 | 20YY-MM-DD-hh:mm:ss | A001 | Pend.Conf |
| V001 | V001-003 | 20YY-MM-DD-hh:mm:ss | A001 | Pend.Conf |
| V001 | V001-004 | 20YY-MM-DD-hh:mm:ss | A001 | Conf |
| V001 | V001-005 | 20YY-MM-DD-hh:mm:ss | A002 | Pend |
| V001 | V001-006 | 20YY-MM-DD-hh:mm:ss | B001 | Pend |
| V001 | V001-007 | 20YY-MM-DD-hh:mm:ss | B002 | Pend |
| V002 | V002-001 | 20YY-MM-DD-hh:mm:ss | A001 | Conf |
| ... | ... | ... | ... | ... |

FIG. 5A

| DATE | 1 | 2 | 3 | 4 | 5 | 6 | 7 | 8 | 9 | 10 | 11 | 12 | 13 | 14 | 15 | 16 | 17 | 18 | 19 | 20 | ... |
|---|---|---|---|---|---|---|---|---|---|---|---|---|---|---|---|---|---|---|---|---|---|
| LIGHTING INFORMATION OF WARNING LIGHT | | | ● | | | | | | | | | | | | | | | | | | |
| MID WARNING INFORMATION | | | | | | | | | | | | | | | | | | | | | |
| DTC | | | | | | | | | | | | | | | | | | | | | |
| A001 | | | | | | | | | | | | | | | | | | | | | |
| A002 | | | | ▨ | ▨ | | | | | | | | | | | | | | | | |

| DATE | 1 | 2 | 3 | 4 | 5 | 6 | 7 | 8 | 9 | 10 | 11 | 12 | 13 | 14 | 15 | 16 | 17 | 18 | 19 | 20 | ... |
|---|---|---|---|---|---|---|---|---|---|---|---|---|---|---|---|---|---|---|---|---|---|
| LIGHTING INFORMATION OF WARNING LIGHT | | | | ● | ● | | | | | | | | | | | | | | | | |
| MID WARNING INFORMATION | | | | | | | | | | | | | | | | | | | | | |
| DTC | | | | | | | | | | | | | | | | | | | | | |
| A001 | | | | | | | | | | | | | | | | | | | ▦ | ▦ | |
| A002 | | | | ▨ | ▨ | | | | | | | | | | | | | | | | |

FIG. 6B

INFORMATION PROCESSING APPARATUS AND STORAGE MEDIUM

CROSS-REFERENCE TO RELATED APPLICATION(S)

This application claims priority to and the benefit of Japanese Patent Application No. 2021-195623 filed on Dec. 1, 2021, the entire disclosure of which is incorporated herein by reference.

BACKGROUND OF THE INVENTION

Field of the Invention

The present invention relates to an information processing apparatus, and a storage medium.

Description of the Related Art

A technique for diagnosing a trouble of a vehicle, based on information stored in a control device of the vehicle is known. For example, Japanese Patent Laid-Open No. 2015-229364 discloses that a trouble diagnosis machine is connected with a control device of a vehicle, and reads information such as a trouble code (DTC: Diagnostic Trouble Code) stored in the control device, and identifies a trouble cause.

SUMMARY OF THE INVENTION

According to an embodiment of the present invention, there is provided an information processing apparatus comprising: an acquisition unit configured to acquire, from a server that accumulates vehicle information, the vehicle information including a trouble code stored by a control device of a vehicle, a status about an event to be identified by the trouble code, and date and time information associated with the trouble code and the status; a generation unit configured to generate display data for displaying a sequence of a trouble in the vehicle, based on the vehicle information that has been acquired by the acquisition unit; and a display control unit configured to cause a display device to display the display data that has been generated by the generation unit.

According to another embodiment of the present invention, there is provided a computer-readable storage medium storing a program for causing a computer to function as: an acquisition unit configured to acquire, from a server that accumulates vehicle information, the vehicle information including a trouble code stored by a control device of a vehicle, a status about an event to be identified by the trouble code, and date and time information associated with the trouble code and the status; a generation unit configured to generate display data for displaying a sequence of a trouble in the vehicle, based on the vehicle information that has been acquired by the acquisition unit; and a display control unit configured to cause a display device to display the display data that has been generated by the generation unit.

BRIEF DESCRIPTION OF THE DRAWINGS

FIG. 2 is a diagram illustrating a configuration example of data related to vehicle information, of a vehicle V, managed by a server;

FIG. 5A is a diagram illustrating an example of a table in a calendar format for every trouble type;

FIG. 5B is a diagram illustrating an example of a table in a calendar format for every trouble type;

FIG. 6A is a diagram illustrating an example of a table in a calendar format for every trouble type;

FIG. 6B is a diagram illustrating an example of a table in a calendar format for every trouble type;

DESCRIPTION OF THE EMBODIMENTS

Figure 1:
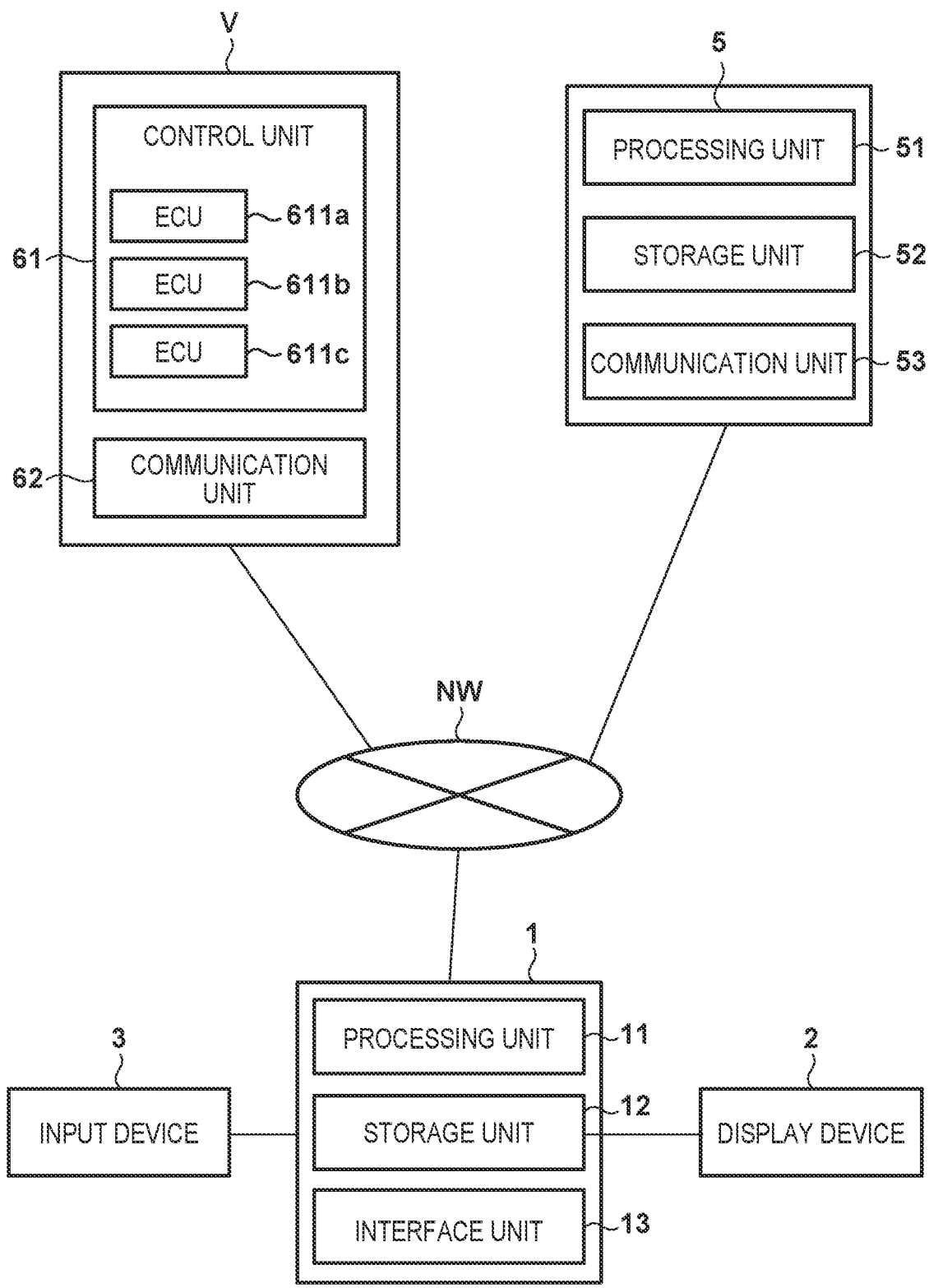
FIG. 1 is a diagram illustrating an outline of a trouble diagnosis system.

A trouble of the vehicle can be classified into a temporary trouble that occurs in a single event, an intermittent trouble that occurs intermittently until the fundamental cause of the trouble is eliminated, or a continuous trouble that is continuing also at present. In a case where a vehicle is brought to repair, a person in charge at a retailer is demanded to take an action in accordance with the type of the trouble. However, in the above-described conventional technique, it may be difficult to determine whether the occurring trouble is a temporary or intermittent one.

In embodiments of the present invention, a technique for facilitating confirmation of the situation of a vehicle is provided.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

<Outline of System>

FIG. 1 is a diagram illustrating an outline of a trouble diagnosis system SY. The trouble diagnosis system SY is a system for doing a trouble diagnosis of the vehicle V, and includes an information processing apparatus 1 and a server 5. As an outline, the server 5 receives vehicle information including a trouble code and the like to be described later from the vehicle V, and manages the information. The information processing apparatus 1 acquires information about the vehicle V from the server 5, and causes a display device 2 to display the information about a trouble situation of the vehicle V.

The vehicle V includes a control device 61 and a communication unit 62. The control device 61 includes a plurality of ECUs 611a to 611c (hereinafter, collectively referred to as an ECU 611). Each ECU 611 includes a processor represented by a CPU, a storage device such as a semiconductor memory or the like, an interface with an external device, and the like. The storage device stores programs to be executed by the processor, data used by the processor for processing, and the like. Each ECU 611 may include a plurality of storage devices, interfaces, and the like. In addition, at least a part of the functions achieved by the control device 61 may be implemented by a dedicated integrated circuit such as an application specific integrated circuit (ASIC). The respective ECUs 611 are communicably connected with one another via an in-vehicle network such as a controller area network (CAN).

The control device 61 can include, as the ECU 611, for example, an ECU that controls a drive source such as an engine or a motor, an ECU that controls the supply of the power by a battery mounted on the vehicle V, an ECU that performs a detection process of a surrounding situation of the vehicle V, and the like. In addition, for example, an ECU of a display system that controls display contents of an instrument panel, lighting of a warning light, and the like can be included. Note that the number of ECUs and the functions assigned to the ECUs can be designed as appropriate, and can be subdivided or integrated, when compared with the present embodiment.

The communication unit 62 communicates with an external device via a network NW. In the present embodiment, the communication unit 62 transmits the vehicle information of the vehicle V to the server 5. The communication unit 62 is, for example, a telematics control unit (TCU). As will be described later in detail, the communication unit 62 is configured to be capable of conducting bidirectional communication with each ECU 611 of the control device 61, and confirms whether a trouble code to be described later is stored in each ECU 611 at a predetermined cycle. Then, when confirming that the trouble code is stored in any of the ECUs 611, the communication unit 62 acquires vehicle information including the trouble code from the target ECU, and transmits the information that has been acquired to the server 5.

The server 5 manages and accumulates the vehicle information that has been received from the vehicle V. The server 5 includes a processing unit 51, a storage unit 52, and a communication unit 53. The processing unit 51 is a processor represented by a CPU. The storage unit 52 is a storage device such as a semiconductor memory, and stores programs to be executed by the processing unit 51, data used by the processing unit 51 for processing, and the like. The processing unit 51 reads and executes the programs stored in the storage unit 52, and thus achieves various functions of the server 5. The communication unit 53 communicates with an external device. Note that the server 5 may be constructed of one physical server, or may be constructed with a plurality of physical servers. Alternatively, the server 5 may be constructed as a virtual server in a cloud service. In addition, at least a part of the functions achieved by the server 5 may be implemented by a dedicated integrated circuit such as an ASIC.

The information processing apparatus 1 causes the display device 2 to display the information about the vehicle V. The information processing apparatus 1 is, for example, a terminal such as a personal computer, a tablet, or a smartphone used in a retailer (dealer), a maintenance factory, or the like, and one or a plurality of information processing apparatuses 1 can be installed in each site. The information processing apparatus 1 includes a processing unit 11, a storage unit 12, and an interface unit 13. The processing unit 11 is a processor represented by a CPU. The storage unit 12 is a storage device such as a semiconductor memory, and stores programs to be executed by the processing unit 11, data used by the processing unit 11 for processing, and the like. The processing unit 11 reads and executes the programs stored in the storage unit 12, and thus achieves the functions of the information processing apparatus 1. The program to be executed by the processing unit 11 can also be installed in the information processing apparatus 1 by use of a storage medium such as a CD-ROM. In addition, at least a part of the functions achieved by the information processing apparatus 1 may be implemented by a dedicated integrated circuit such as an ASIC. The interface unit 13 can include an input and output interface used for connection with a peripheral device and a communication interface used for communication with an external device. In the present embodiment, the information processing apparatus 1 is connected with a display device 2, which displays various types of information, and an input device 3, which receives a user's operation. However, a configuration in which the information processing apparatus 1 includes the display device 2 and the input device 3 can also be adopted.

<Data Configuration Example>

FIG. 2 is a diagram illustrating a configuration example of data related to the vehicle information, of the vehicle V, managed by the server 5. In the present embodiment, the vehicle V transmits the vehicle information, including a trouble code stored in the control device 61 and date and time information associated with the trouble code, to the server 5 through the communication unit 62. The server 5 manages and accumulates the vehicle information that has been received from the vehicle V. Here, "vehicle ID", "event ID", "occurrence time", "trouble code", and "status" are included as constituent elements of data managed by the server 5.

The "vehicle ID" is an ID for identifying the vehicle V. The "event ID" is an ID for identifying an event such as a trouble or an abnormality that has occurred in the vehicle V. The "occurrence time" is a time when a target event occurs. In detail, the "occurrence time" can be a time when each ECU 611 stores a trouble code to be described next. The "trouble code" is a code for identifying the content of the event that has occurred. The "status" indicates a status of the event to be identified by the trouble code. In the present embodiment, "Pend", "Pend.Conf", and "Conf" are each set as "status" from bit 2: PendingDTC and bit 3: ConfirmedDTC, which are bit position information of the Status of DTC. Note that the Status of DTC means a status used in a trouble diagnosis function equipped in an electronic control unit (ECU) for the engine or transmission, and complies with ISO 14229. "Pend" indicates that there is a possibility of a trouble at present. "Pend.Conf" indicates that a trouble has been decided at present. "Conf" indicates a situation in which a trouble has been decided in the past, although it is normal at present.

Note that the type of status can be set as appropriate. In the present embodiment, each trouble code can take a total of four statuses, by including a case of no status in which no particular trouble occurs. However, it may be configured that only "Pend" is set as the status, and only whether there is a possibility of a trouble can be determined. Alternatively, two statuses of "Pend" and "Pend.Conf" may be set as the statuses, or any status other than the above-described statuses may be included. The mode including "Pend", "Pend.Conf", and "Conf" as the statuses as in the present embodiment can be adopted in, for example, an engine, a transmission, a motor as a drive source, or a trouble code of a power train system such as a high-voltage battery.

In the present embodiment, each ECU 611 of the control device 61 performs a detection process of a trouble or the like at a predetermined timing. Then, when a current or past trouble or the like is detected by the detection process, each ECU 611 stores a trouble code corresponding to the detected content in association with the status and the time. On the other hand, the communication unit 62 confirms whether a trouble code is stored in each ECU 611 at a predetermined cycle. Then, when there is a response indicating that each ECU 611 stores the trouble code, the communication unit 62 requests the target ECU 611 for information including the trouble code. Upon receipt of the information including the trouble code from the target ECU 611, the communication unit 62 associates the received information with a vehicle ID, an event ID, or the like, and transmits the information to the server 5, as the vehicle information.

Note that although not illustrated, the communication unit 62 of the vehicle V can also transmit, to the server 5, various parameters, position information, and the like at the time when the trouble code is stored and before and after such a time, as the vehicle information together with the information illustrated in FIG. 2. Examples of the various parameters include parameters of an operation system such as an accelerator pedal opening degree and a brake switch each indicating a driving situation of the vehicle V, and parameters of a control system such as an engine speed and an engine cooling water temperature.

In a retailer (dealer), a maintenance factory, or the like, by use of the vehicle information accumulated and managed by the server 5, it is possible to confirm a sequence or the like of the trouble of the vehicle V by use of the information processing apparatus 1. For example, when a user of the vehicle V recognizes a trouble of the vehicle V by turning on a warning light or the like and requests a retailer to do repairs, a worker of the retailer confirms the sequence of the trouble of the vehicle V by use of the information processing apparatus 1. Accordingly, the worker is able to grasp the cause of the trouble, whether the trouble is a temporary or intermittent one, and the like. Therefore, the worker is able to take an appropriate action in accordance with the situation of the vehicle V. Hereinafter, processing of the information processing apparatus 1 in this situation will be described.

<Processing Example>

Figure 3:
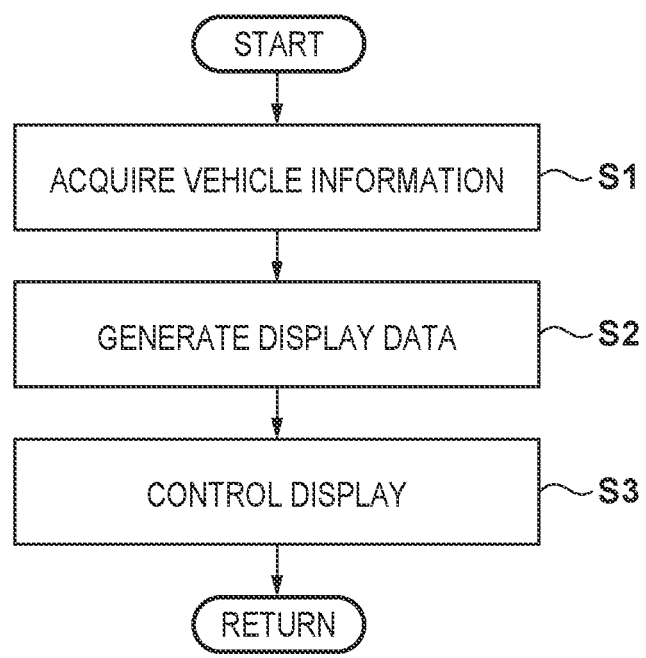
FIG. 3 is a flowchart illustrating a processing example of a processing unit of an information processing apparatus.

FIG. 3 is a flowchart illustrating a processing example of the processing unit 11 of the information processing apparatus 1. This flowchart is confirmed by the processing unit 11 reading and executing the program stored in the storage unit 12. For example, the information processing apparatus 1 starts this flowchart, when the input device 3 receives a confirmation request for the vehicle information of the vehicle V.

In S1, the processing unit 11 acquires the vehicle information from the server 5 via the interface unit 13. For example, the processing unit 11 transmits the confirmation request for the vehicle information to the server 5. Here, the confirmation request includes the vehicle ID of the target vehicle. The server 5 transmits the vehicle information of the target vehicle V to the information processing apparatus 1, based on the vehicle ID that has been received. The processing unit 11 acquires the vehicle information that has been transmitted from the server 5 via the interface unit 13.

In S2, the processing unit 11 generates display data to be displayed on the display device 2. The processing unit 11 generates the display data for displaying the sequence of the trouble in the vehicle V, based on the vehicle information acquired in S1. In S3, the processing unit 11 conducts display control. That is, the processing unit 11 causes the display device 2 to display the display data generated in S2.

<Screen Example>

Figure 4:
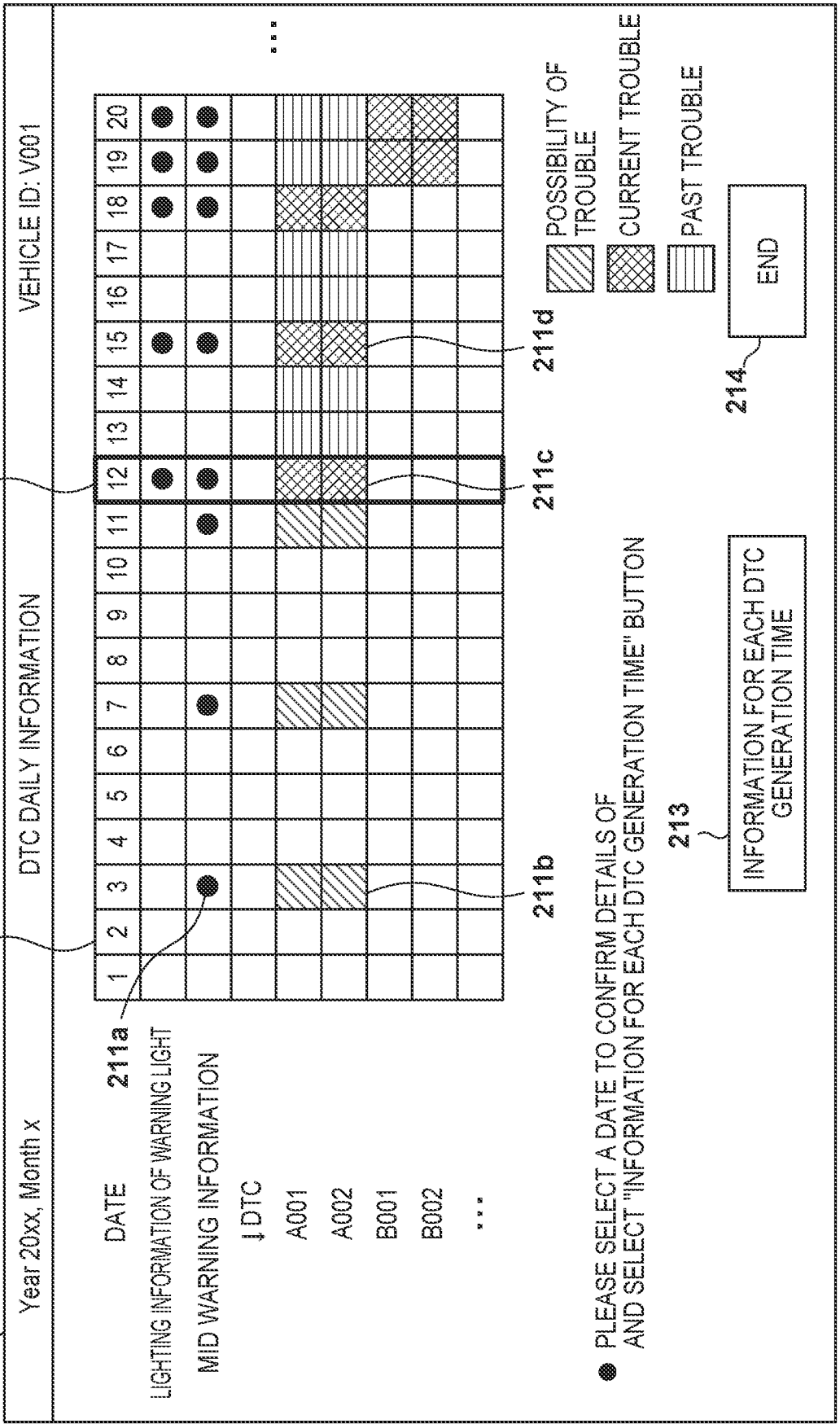
FIG. 4 is a view illustrating a display example of a display device.

FIG. 4 is a diagram illustrating a display example of the display device 2, and illustrates an example of display data for indicating a sequence of a trouble in the vehicle V. In a display screen 21 illustrated in FIG. 4, the sequence of the trouble of the vehicle V is indicated on a table 211 in a calendar format. Furthermore, as the sequence of the trouble of the vehicle V, the stored situation of the trouble code and the like for every date is indicated on the table 211 in a calendar format. Hereinafter, display contents will be specifically described. Note that, in the following drawings, reference numerals of a plurality of illustrated component elements will be omitted in consideration of visibility of the drawings, in some cases.

On the display screen 21 illustrated in FIG. 4, lighting information of a warning light, warning information of a multi-information display (MID), and the name of each trouble code are set as display items, and daily situations of these display items are listed on the table 211. Regarding the lighting information of the warning light, a date when the warning light was lit is indicated by a black circle 211a. In addition, regarding the warning information of the MID, a date when a warning message is displayed in the MID is indicated by the black circle 211a. Here, the warning light is represented by, for example, an engine warning light, a brake warning light, or a hydraulic warning light, and a corresponding mark lights on when a trouble or an abnormality is detected in the vehicle V. In addition, the warning information of the MID notifies a trouble or an abnormality in a character string such as "abnormality in electronically controlled parking brake".

In addition, in FIG. 4, a daily status is illustrated for every trouble code. In the present embodiment, the statuses "Pend", "Pend.Conf", and "Conf" are displayed in different modes (patterns 211b to 211d) for every trouble code. That is, occurrence situations of the troubles identified by the trouble codes are respectively displayed in different modes. Examples of the occurrence situations of the troubles include a situation corresponding to "Pend" with a possibility of a trouble, a situation corresponding to "Pend.Conf" with a trouble occurring at present having been decided, and a situation corresponding to "Conf" with a trouble having been decided in the past. Note that, here, the differences in the situation are indicated by differences in hatching pattern in squares, but the differences in the situation may be indicated by differences in color in the squares. The differences in the situation may be indicated by differences in shape of a mark, the presence or absence of filling in the mark, or the like. Note that in the present embodiment, on the table 211, dates are arranged horizontally, and the respective display items are arranged vertically, but the vertical and horizontal directions may be reversed. In addition, ruled lines on the table 211 may be appropriately omitted. Further, the displayed period may be changeable.

It is possible to identify the situation of the vehicle V, based on in which status the trouble code is stored in the ECU 611. Therefore, it can be said that, as the sequence of the trouble of the vehicle V, a vehicle situation with a possibility of a trouble, a vehicle situation with a trouble that is occurring, and a vehicle situation with a trouble that has occurred in the past are displayed in different modes on the display screen 21.

When viewed from another point of view, it is possible to identify the occurrence situation of the trouble to be identified by the trouble code, based on in which status the trouble code is stored in the ECU 611. Therefore, it can be said that, on the display screen 21, as the occurrence situation of the trouble, a situation with a trouble possibility, a situation with a trouble at present that has been decided, and a situation with a trouble that has been decided in the past are displayed in different modes.

In addition, the display screen 21 is configured so that the date in the table 211 is selectable. Here, a column including the date selected in the table 211 is indicated by a thick frame 212. When a button 213 is selected in this state, the processing unit 11 displays the vehicle information in a calendar format for each storage time of the trouble code and the like (see FIG. 7). Further, when a button 214 is selected, the processing unit 11 ends displaying the vehicle information.

By visualizing the sequence of the trouble of the vehicle V like the display screen 21 of FIG. 4, workers of the retailer or the like are able to easily confirm whether the trouble that has occurred in the vehicle V is temporary, intermittent, or still continuing. Accordingly, the workers are able to handle the repair or the like of the vehicle V in a more appropriate manner at the retailer or the like. This point will be specifically described below.

Figures 6A, 6B:
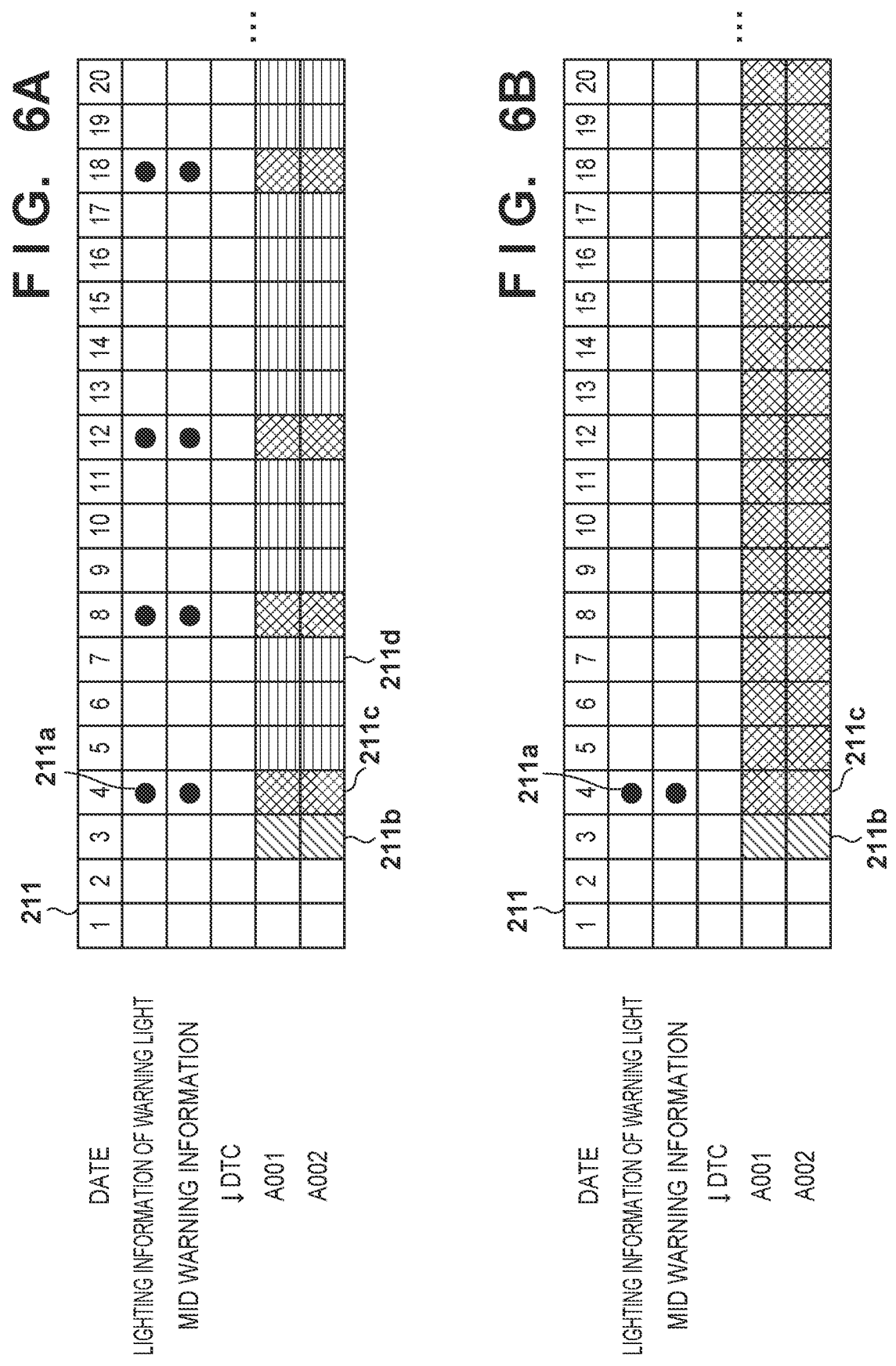

FIGS. 5A to 6B illustrate examples of the table 211 in a calendar format for every trouble type. FIGS. 5A and 5B illustrate examples of the table 211, in a case where a temporary trouble occurs in the vehicle V. In addition, FIG. 6A illustrates an example of the table 211, in a case where an intermittent trouble occurs in the vehicle V. FIG. 6B illustrates an example of the table 211, in a case where a continuous trouble has been occurring in the vehicle V up to the present.

FIG. 5A illustrates a case where trouble codes A001 and A002 are stored only in one date, and its status is "Pend". In this example, since the trouble code is no longer stored before the trouble is decided (before the status becomes "Pend.Conf"), a worker who looks at the display screen 21 is able to determine that this event is temporary. In addition, FIG. 5B illustrates a case where the trouble codes A001 and A002 are stored with the status "Pend.Conf" only in one date, and then are continuously stored with the status "Conf". Also in this case, the worker who looks at the display screen 21 is able to determine that the current event is temporary. In these cases, even though the worker receives a request for repair of the vehicle V, the worker can suggest the customer to see the situation of the vehicle V for a while without immediately doing repairs. Note that in the present embodiment, in a case where the status "Conf" continues a predetermined number of times, that is, in a case where normality determination continues a predetermined number of times, the trouble code is set to be deleted.

FIG. 6A illustrates a case where the trouble codes A001 and A002 are intermittently stored as a status "Pend.Conf", that is, a case where a trouble is intermittently decided. In this case, the worker who looks at the display screen 21 is able to determine that the current event is intermittent, and its repair is needed. FIG. 6B illustrates a case where the trouble codes A001 and A002 are continuously stored with a status "Pend.Conf", that is, the trouble codes A001 and A002 are continuously stored in a state where the trouble is decided. In this case, the worker who looks at the display screen 21 is able to determine that the current event is continuous, and its repair is needed.

Figure 7:
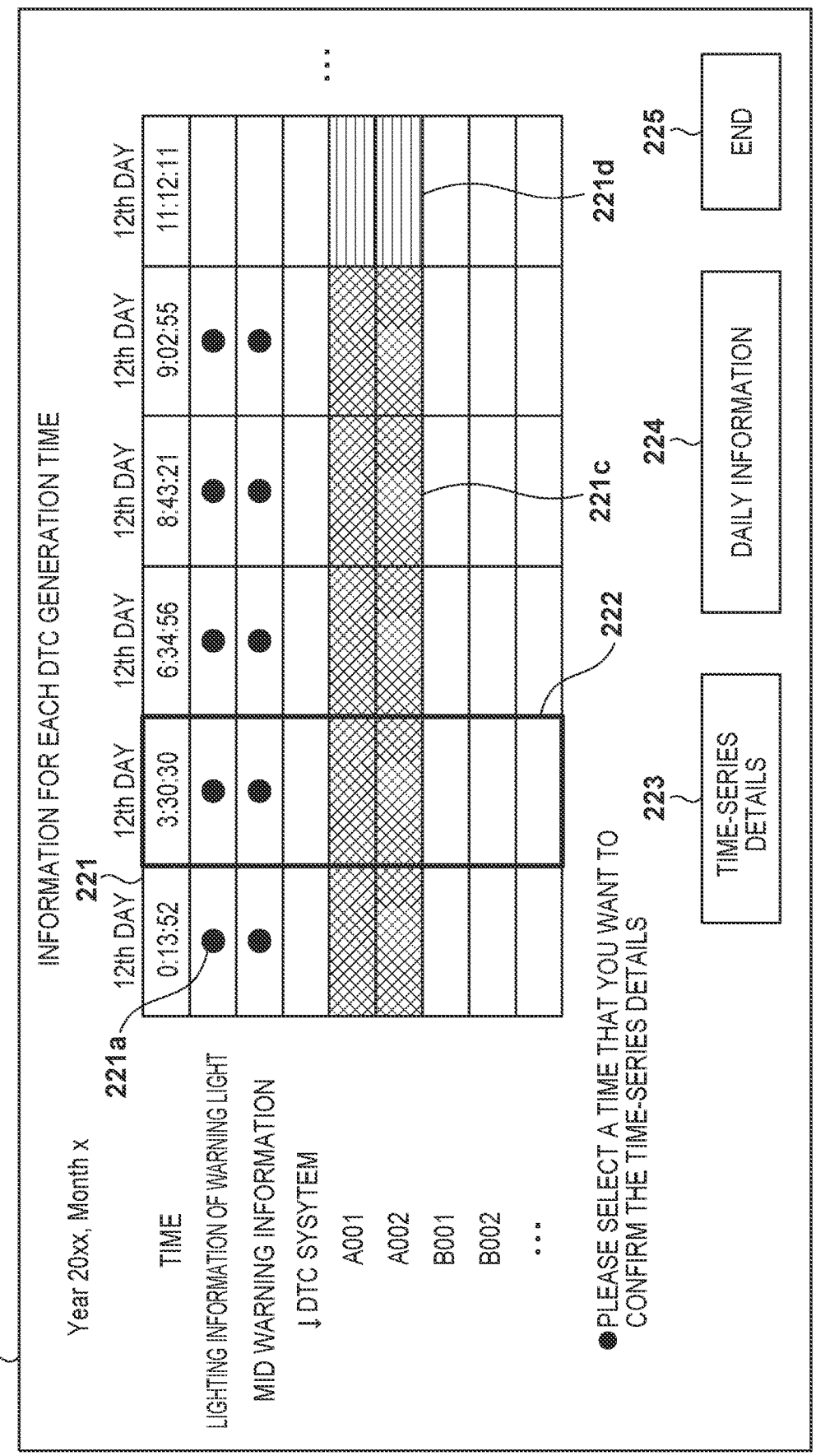
FIG. 7 is a view illustrating a display example of the display device.

FIG. 4 is referred to again. In consideration of the above description, it is difficult to determine trouble codes B001 and B002 only with the displayed information, but it can be understood that an intermittent trouble occurs in the trouble codes A001 and A002. In addition, since the status "Pend.Conf" occurs on different dates between the trouble codes A001 and A002 and the trouble codes B001 and B002, it is possible to suppose that either one of them is not the trouble that occurs in association with the other one, and the trouble that occurs from a different cause. In this manner, by confirming the sequence of the trouble of the vehicle V on the display screen 21, the worker is able to more accurately grasp the situation of the vehicle V FIG. 7 is a diagram illustrating a display example of the display device 2, and illustrates an example of display data for indicating the sequence of the trouble in the vehicle V. On a display screen 22 illustrated in FIG. 7, the sequence of the trouble of the vehicle V is indicated on a table 221 in a calendar format. Furthermore, as the sequence of the trouble of the vehicle V, the stored situation of the trouble code and the like for every date and time (time) when the trouble code and the like are stored is illustrated on the table 221 in a calendar format.

On the display screen 22 illustrated in FIG. 7, lighting information of the warning light, warning information of the multi-information display (MID), and the name of each trouble code are set as display items, and daily situations of these display items are listed on the table 221. The table 221 is mainly different from the table 211 in FIG. 4 in that a row of an occurrence time of the trouble code is provided, instead of an occurrence date. Black circles 221a and patterns 221b to 221d are respectively similar to the black circles 211a and the patterns 211b to 211d in FIG. 4, and thus descriptions thereof will be omitted.

In addition, the display screen 22 is configured so that a time in the table 221 is selectable. Here, a column including the time selected in the table 221 is indicated by a thick frame 222. When a button 233 is selected in this state, the processing unit 11 displays details in a time-series manner at the selected time (see FIG. 8). Further, when a button 224 is selected, the processing unit 11 returns to the display screen 21 of FIG. 4, and when a button 225 is selected, the display of the vehicle information ends.

By visualizing the sequence of the trouble of the vehicle V like the display screen 22 of FIG. 7, it is possible to confirm a transitional change in the trouble that has occurred in the vehicle V in a relatively short period of time.

Figure 8:
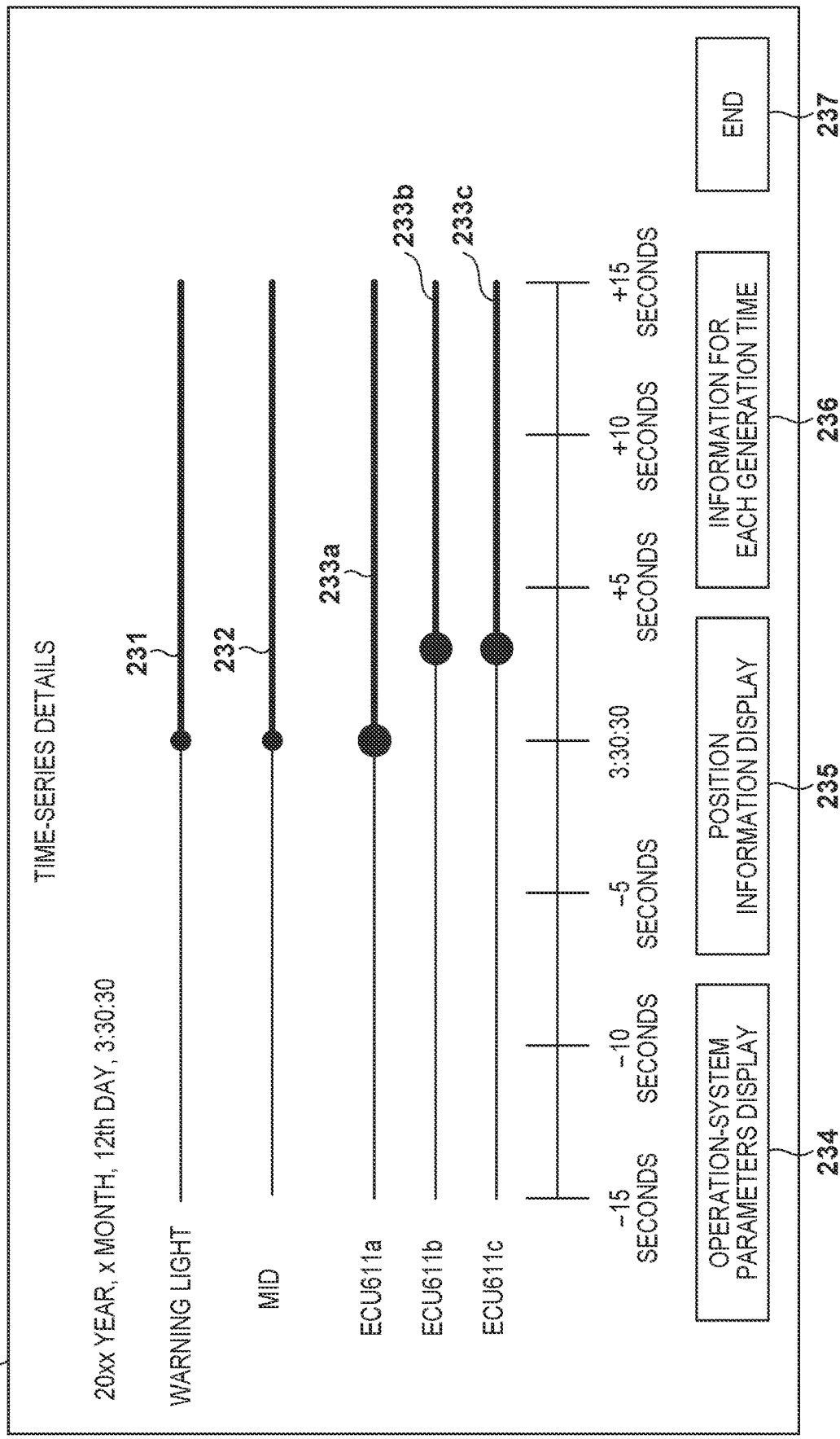
FIG. 8 is a view illustrating a display example of the display device.

FIG. 8 is a diagram illustrating a display example of the display device 2, and illustrates detailed information of predetermined parameters of the vehicle V in a time-series manner before and after a specific time. That is, the processing unit 11 causes the display device 2 to display various parameters of the vehicle V for a predetermined period before and after the time identified by the date and time information. On a display screen 23, a lighting situation 231 of the warning light, a warning situation 232 of the MID, and stored situations 233a to 233c of the trouble codes of each ECU 611 are displayed in a time-series manner. In this example, the display is given such that the warning light is turned on and a warning by the MID is given in association with the trouble code being stored in the ECU 611a, and then the trouble code is additionally stored in the ECUs 611b and 611c. Accordingly, the worker is able to suppose that the root cause of the trouble is related to the process of the ECU 611a. In addition, when a button 234 is selected, the processing unit 11 proceeds to a display screen 24 in FIG. 9, and when a button 235 is selected, the processing unit 11 proceeds to a display screen 25 in FIG. 10. Further, when a button 236 is selected, the processing unit 11 returns to the display screen 22 of FIG. 7, and when a button 237 is selected, the processing unit 11 ends the display of the vehicle information. Note that, on the display screen 23, temporal changes of various parameters for 15 seconds before and after the time identified by the date and time information, that is, a total of 30 seconds are illustrated. However, the length of the displayed time can be appropriately changed. Further, here, for convenience, an ECU and reference numeral is used as a name like "ECU611a". However, a system name, a trouble code, or the like of a control target of the ECU, such as IMG, BAT, or ENG, may be used as the name to be displayed on the display screen 23.

Figure 9:
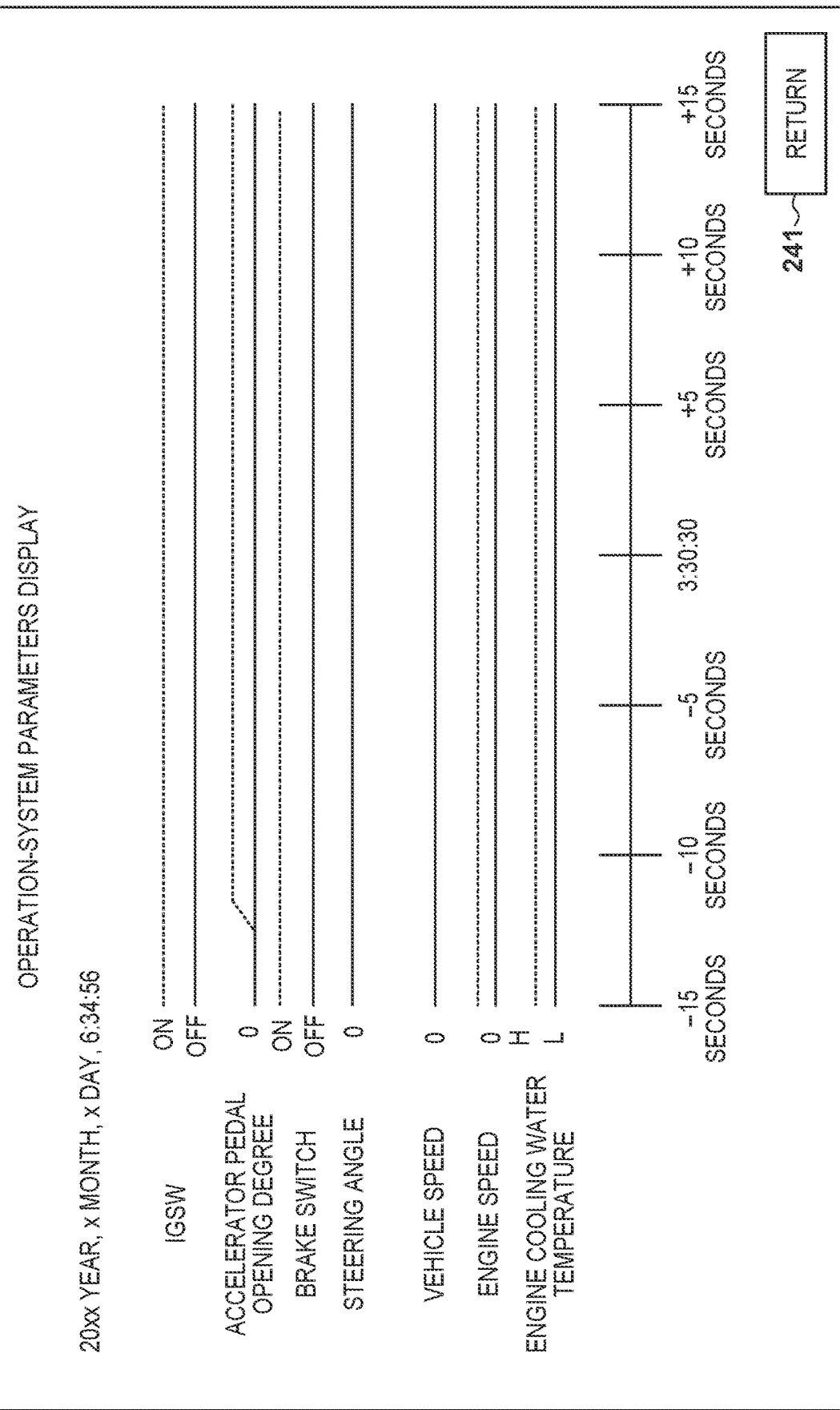
FIG. 9 is a view illustrating a display example of the display device.

FIG. 9 is a diagram illustrating a display example of the display device 2, and illustrates detailed information of operation-system parameters in a time-series manner before and after a specific time of the vehicle V. On the display screen 24, temporal changes of an ignition switch (IGSW), an accelerator pedal opening degree, a brake switch, a steering angle, a vehicle speed, an engine speed, and an engine temperature for 15 seconds before and after the occurrence time of the trouble code. In this example, it can be confirmed that the driver was continuously depressing the accelerator pedal and the brake pedal simultaneously for a predetermined period of time. The worker is able to confirm the relationship between the situation of a driver's operation and the trouble code that is issued. When a button 241 is selected, the processing unit 11 returns to the display screen 22 in FIG. 7.

Figure 10:
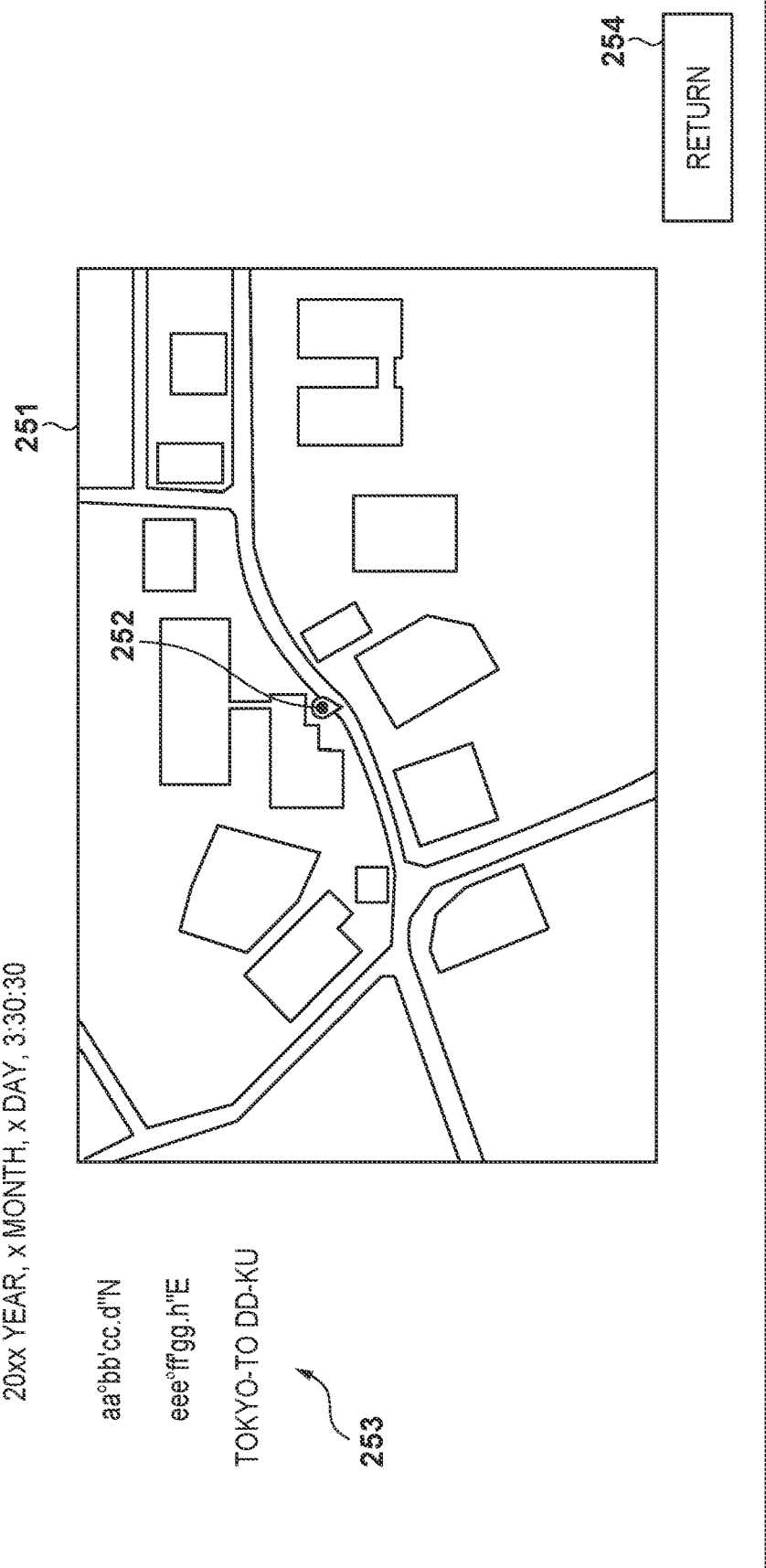
FIG. 10 is a view illustrating a display example of the display device.

FIG. 10 is a diagram illustrating a display example of the display device 2, and illustrates position information of the vehicle when a trouble code is stored in the vehicle V. In detail, on the display screen 25, a pin 252 indicating the position information of the vehicle V at the time of storing the trouble code is displayed on a map 251. In addition, information of latitude and longitude and the name of its place is displayed in a display area 253. For example, in a place where a load is likely to be applied to the drive system of the vehicle V such as a slope land, the frequency of storing the trouble code may be relatively higher than that of the other places. Therefore, by identifying the traveling location of the vehicle V when the trouble code is generated, it is possible to easily identify the trouble cause of the vehicle. When a button 254 is selected, the processing unit 11 returns to the display screen 22 in FIG. 7.

As described heretofore, according to the present embodiment, since the sequence of the trouble in the vehicle V is displayed on the display device 2, it becomes possible to easily confirm the situation of the vehicle V. As a comparative example, for example, in a case where only a DTC code that has been generated in the past is recorded but a history such as a time or a place when the DTC code was generated is not stored, or in a case where the DTC code is not recorded, it may be difficult to determine whether the occurring trouble is temporary, intermittent, or continuous. In contrast, in the present embodiment, the sequence of the trouble is displayed on the display device 2, based on the vehicle information including the trouble code and the date and time information associated with the trouble code. Therefore, the worker is able to easily confirm the type of the trouble.

<Summary of Embodiments>

The above embodiments disclose at least the following information processing apparatus and storage medium.

1. An information processing apparatus (for example, 1) of the above embodiments comprises:
  an acquisition unit (for example, 11, S1) configured to acquire, from a server that accumulates vehicle information, the vehicle information including a trouble code stored by a control device of a vehicle, a status about an event to be identified by the trouble code, and date and time information associated with the trouble code and the status;
  a generation unit (for example, 11, S2) configured to generate display data for displaying a sequence of a trouble in the vehicle, based on the vehicle information that has been acquired by the acquisition unit; and
  a display control unit (for example, 11, S3) configured to cause a display device to display the display data that has been generated by the generation unit.

According to this embodiment, the sequence of the trouble is visualized, and thus the trouble situation of the vehicle can be easily confirmed. In detail, the trouble situation can be confirmed as the sequence of the trouble, and thus the type of the trouble such as the temporary trouble, the intermittent trouble, or the continuous trouble can be easily confirmed.

2. According to the above embodiment,
  the display control unit causes the display device to display
    a first vehicle situation (for example, 211b) in which there is a possibility of the trouble,
    a second vehicle situation (for example, 211c) in which the trouble is occurring, and
    a third vehicle situation (for example, 211d) in which the trouble has occurred in a past,
  as the sequence of the trouble, in different modes.

According to this embodiment, the trouble situation of the vehicle is displayed in different modes, and thus the trouble situation can be easily confirmed.

3. According to the above embodiment, p1 the display control unit causes the display device to display the sequence of the trouble in the vehicle in a calendar format (for example, 21).

According to this embodiment, the sequence of the trouble of the vehicle can be confirmed easily in a visualized manner.

4. According to the above embodiment,
  the display control unit causes the display device to display an occurrence situation of the trouble to be identified by the trouble code and the status in a daily calendar format (for example, 211).

According to this embodiment, the sequence of the trouble for a relatively long period of time can be easily confirmed.

5. According to the above embodiment,
  the display control unit causes the display device to display an occurrence situation of the trouble to be identified by the trouble code and the status in a calendar format for every date and time to be identified by the date and time information (for example, 22).

According to this embodiment, the sequence of the trouble for a relatively short period of time can be easily confirmed.

6. According to the above embodiment,
  the occurrence situation of the trouble includes:
    a first occurrence situation (for example, 211b) indicating a possibility of the trouble;
    a second occurrence situation (for example, 211c) indicating a decision of the trouble at present; and
    a third occurrence situation (for example, 211d) indicating a decision of the trouble in a past, and
  the display control unit causes the display device to display the first occurrence situation, the second occurrence situation, and the third occurrence situation in different modes.

According to this embodiment, the trouble situation of the vehicle is displayed in a different manner in accordance with an occurrence situation of the trouble, and thus the trouble situation can be easily confirmed.

7. According to the above embodiment,
the display control unit causes the display device to display the first occurrence situation, the second occurrence situation, and the third occurrence situation in different colors.

According to this embodiment, the trouble situation of the vehicle is displayed in a different color in accordance with an occurrence situation of the trouble, and thus the trouble situation can be easily confirmed.

8. According to the above embodiment,
the display control unit causes the display device to display a parameter of the vehicle for a predetermined period of time before and after a time to be identified by the date and time information (for example, 23).

According to this embodiment, a detailed situation of the vehicle before and after the trouble code is stored can be confirmed.

9. According to the above embodiment,
the parameter includes a parameter related to an operation on the vehicle (for example, 25).

According to this embodiment, the relationship between an occurrence of the trouble and a driver's operation can be easily confirmed.

10. According to the above embodiment,
the display control unit causes the display device to display information about a place of the vehicle on a date and time to be identified by the date and time information (for example, 25).

According to this embodiment, the relationship between an occurrence of the trouble and a traveling environment of the vehicle can be easily confirmed.

11. According to the above embodiment,
the status is a status of a diagnostic trouble code (DTC) in compliance with ISO 14229.

According to this embodiment, the sequence of the trouble can be visualized by use of the Status of DTC.

12. A computer-readable storage medium of the above embodiments stores a program for causing a computer to function as:
an acquisition unit (for example, 51) configured to acquire, from a server that accumulates vehicle information, the vehicle information including a trouble code stored by a control device of a vehicle, a status about an event to be identified by the trouble code, and date and time information associated with the trouble code and the status;
a generation unit (for example, S2) configured to generate display data for displaying a sequence of a trouble in the vehicle, based on the vehicle information that has been acquired by the acquisition unit; and
a display control unit (for example, S3) configured to cause a display device to display the display data that has been generated by the generation unit.

According to this embodiment, the sequence of the trouble is visualized, and thus the trouble situation of the vehicle can be easily confirmed. In detail, the trouble situation can be confirmed as the sequence of the trouble, and thus the type of the trouble such as the temporary trouble or the intermittent trouble can be easily confirmed.

The invention is not limited to the foregoing embodiments, and various variations/changes are possible within the spirit of the invention.

What is claimed is:

1. An information processing apparatus comprising a processor and a storage device, the storage device storing a program executable by the processor to:
acquire, from a server that accumulates vehicle information, the vehicle information including a trouble code stored by a control device of a vehicle, a status about an event to be identified by the trouble code, and date and time information associated with the trouble code and the status;
generate display data for displaying a sequence of a trouble in the vehicle, based on the vehicle information that has been acquired; and
cause a display device to display the display data that has been generated,
wherein the processor causes the display device to display, as the sequence of the trouble,
a first vehicle situation in which there is a possibility of the trouble,
a second vehicle situation in which the trouble is occurring, and
a third vehicle situation in which the trouble has occurred in a past, in different modes,
wherein the control device of the vehicle comprises an electronic control unit (ECU) that controls a drive source of the vehicle, controls supply of power by a battery mounted on the vehicle, performs a detection process of a surrounding situation of the vehicle, and stores the trouble code therein.

2. The information processing apparatus according to claim 1, wherein
the processor causes the display device to display the sequence of the trouble in the vehicle in a calendar format.

3. The information processing apparatus according to claim 1, wherein
the processor causes the display device to display a parameter of the vehicle for a predetermined period of time before and after a time to be identified by the date and time information.

4. The information processing apparatus according to claim 3, wherein
the parameter includes a parameter related to an operation on the vehicle.

5. The information processing apparatus according to claim 3, wherein
the processor causes the display device to display information about a place of the vehicle on a date and time to be identified by the date and time information.

6. The information processing apparatus according to claim 1, wherein
the status is a status of a diagnostic trouble code (DTC) in compliance with ISO 14229.

7. An information processing apparatus comprising a processor and a storage device, the storage device storing a program executable by the processor to:
acquire, from a server that accumulates vehicle information, the vehicle information including a trouble code stored by a control device of a vehicle, a status about an event to be identified by the trouble code, and date and time information associated with the trouble code and the status;
generate display data for displaying a sequence of a trouble in the vehicle, based on the vehicle information that has been acquired; and
cause a display device to display the display data that has been generated, wherein
the processor causes the display device to display an occurrence situation of the trouble to be identified by the trouble code and the status in a daily calendar format,
the occurrence situation of the trouble includes:
a first occurrence situation indicating a possibility of the trouble;
a second occurrence situation indicating a decision of the trouble at present; and
a third occurrence situation indicating a decision of the trouble in a past, and
the processor causes the display device to display the first occurrence situation, the second occurrence situation, and the third occurrence situation in different modes,
wherein the control device of the vehicle comprises an electronic control unit (ECU) that controls a drive source of the vehicle, controls supply of power by a battery mounted on the vehicle, performs a detection process of a surrounding situation of the vehicle, and stores the trouble code therein.

8. The information processing apparatus according to claim 7, wherein
the processor causes the display device to display the first occurrence situation, the second occurrence situation, and the third occurrence situation in different colors.

9. An information processing apparatus comprising a processor and a storage device, the storage device storing a program executable by the processor to:
acquire, from a server that accumulates vehicle information, the vehicle information including a trouble code stored by a control device of a vehicle, a status about an event to be identified by the trouble code, and date and time information associated with the trouble code and the status;
generate display data for displaying a sequence of a trouble in the vehicle, based on the vehicle information that has been acquired; and
cause a display device to display the display data that has been generated,
wherein
the processor causes the display device to display an occurrence situation of the trouble to be identified by the trouble code and the status in a calendar format for every date and time to be identified by the date and time information,
the occurrence situation of the trouble includes:
a first occurrence situation indicating a possibility of the trouble;
a second occurrence situation indicating a decision of the trouble at present; and
a third occurrence situation indicating a decision of the trouble in a past, and
the processor causes the display device to display the first occurrence situation, the second occurrence situation, and the third occurrence situation in different modes,
wherein the control device of the vehicle comprises an electronic control unit (ECU) that controls a drive source of the vehicle, controls supply of power by a battery mounted on the vehicle, performs a detection process of a surrounding situation of the vehicle, and stores the trouble code therein.

10. The information processing apparatus according to claim 9, wherein
the processor causes the display device to display the first occurrence situation, the second occurrence situation, and the third occurrence situation in different colors.

11. A non-transitory computer-readable storage medium storing a program executable by a processor to:
acquire, from a server that accumulates vehicle information, the vehicle information including a trouble code stored by a control device of a vehicle, a status about an event to be identified by the trouble code, and date and time information associated with the trouble code and the status;
generate display data for displaying a sequence of a trouble in the vehicle, based on the vehicle information that has been acquired; and
cause a display device to display the display data that has been generated,
wherein
the processor causes the display device to display, as the sequence of the trouble,
a first vehicle situation in which there is a possibility of the trouble,
a second vehicle situation in which the trouble is occurring, and
a third vehicle situation in which the trouble has occurred in a past, in different modes,
wherein the control device of the vehicle comprises an electronic control unit (ECU) that controls a drive source of the vehicle, controls supply of power by a battery mounted on the vehicle. performs a detection process of a surrounding situation of the vehicle, and stores the trouble code therein.

12. A non-transitory computer-readable storage medium storing a program executable by a processor to:
acquire, from a server that accumulates vehicle information, the vehicle information including a trouble code stored by a control device of a vehicle, a status about an event to be identified by the trouble code, and date and time information associated with the trouble code and the status;
generate display data for displaying a sequence of a trouble in the vehicle, based on the vehicle information that has been acquired; and
cause a display device to display the display data that has been generated,
wherein
the processor causes the display device to display an occurrence situation of the trouble to be identified by the trouble code and the status in a daily calendar format,
the occurrence situation of the trouble includes:
a first occurrence situation indicating a possibility of the trouble;
a second occurrence situation indicating a decision of the trouble at present; and
a third occurrence situation indicating a decision of the trouble in a past, and
the processor causes the display device to display the first occurrence situation, the second occurrence situation, and the third occurrence situation in different modes,
wherein the control device of the vehicle comprises an electronic control unit (ECU) that controls a drive source of the vehicle, controls supply of power by a battery mounted on the vehicle, performs a detection process of a surrounding situation of the vehicle, and stores the trouble code therein.

13. A non-transitory computer-readable storage medium storing a program executable by a processor to:
acquire, from a server that accumulates vehicle information, the vehicle information including a trouble code stored by a control device of a vehicle, a status about an event to be identified by the trouble code, and date and time information associated with the trouble code and the status;
generate display data for displaying a sequence of a trouble in the vehicle, based on the vehicle information that has been acquired; and
cause a display device to display the display data that has been generated,
wherein
the processor causes the display device to display an occurrence situation of the trouble to be identified by the trouble code and the status in a calendar format for every date and time to be identified by the date and time information,
the occurrence situation of the trouble includes:
a first occurrence situation indicating a possibility of the trouble;
a second occurrence situation indicating a decision of the trouble at present; and
a third occurrence situation indicating a decision of the trouble in a past, and
the processor causes the display device to display the first occurrence situation, the second occurrence situation, and the third occurrence situation in different modes,
wherein the control device of the vehicle comprises an electronic control unit (ECU) that controls a drive source of the vehicle, controls supply of power by a battery mounted on the vehicle, performs a detection process of a surrounding situation of the vehicle, and stores the trouble code therein.

* * * * *